United States Patent Office 3,706,619
Patented Dec. 19, 1972

3,706,619
METHOD OF BONDING WOOD AND OTHER MATERIALS WITH RAPID-CURING ADHESIVES USING A PRIMER COMPOSITION
Harlan G. Freeman, Seattle, Wash., assignor to Weyerhaeuser Company, Tacoma, Wash.
No Drawing. Filed May 5, 1969, Ser. No. 822,009
Int. Cl. C09j 5/04
U.S. Cl. 156—315      6 Claims

ABSTRACT OF THE DISCLOSURE

Wood and wood products are adhesively bonded together or to other materials using adhesives which cure at ambient temperature. To obtain good bond strength the surfaces to be bonded are first coated with a relatively dilute resinous primer, the primer being a phenol-resorcinol-formaldehyde resin or an epoxidized phenolic Novolac. The primers are dispersed or dissolved in a suitable carrier vehicle such as water or, in the case of the epoxide, an organic solvent. Room temperature setting adhesives based on resorcinol or amine-modified condensation resins are spread over one or both of the primed surfaces and the surfaces brought together to form a glue line therebetween.

FIELD OF THE INVENTION

This invention relates to the process of using a primer composition in conjunction with adhesives that cure at ambient temperature to bond wood and other materials together.

PRIOR ART RELATING TO THE DISCLOSURE

Bonding wood to wood or wood to other materials requires that the adhesive used penetrate into undamaged wood cells on the surface of the wood to be bonded. The adhesive used, in order to penetrate into the cell walls of the wood, must have a sufficiently low viscosity or be allowed to remain in contact with the wood surface in a substantially uncured state for a sufficient length of time. In the manufacture of plywood, for example, penetration of the wood veneers by the commonly used phenol- or urea-formaldehyde resins is obtained principally during the early portion of the hot pressing step when the viscosity of the adhesives has been reduced by the elevated temperature. In making laminated products such as structural beams, phenol-resorcinol-formaldehyde adhesives are commonly used. These resins are catalyzed to cure at room temperature within a period of several hours after assembly and clamping of the members. The long cure times are necessary to insure adequate resin penetration although without this requirement much shorter cure times would be possible.

The problem of gluing wood which has been treated with certain preservatives or fire-retardant materials is one that has never been successfully solved. Ordinarily, freshly planed surfaces are necessary if even a marginally acceptable bond is to be obtained. Results using room-temperature curing adhesives have been especially poor, in large part due to the increased difficulty of these adhesives penetrating into the surface cells of the salt impregnated wood.

Nevin, in U.S. Pats. 2,068,759 and 2,232,718 has recognized that dilute resin solutions are more effective in penetration of surface areas of wood. He applies successive coatings of increasingly higher solids content resin adhesives which are each allowed to dry before application of the succeeding coat. Nevin apparently did not recognize the full importance of penetration to bond quality since his goal was to achieve a controlled low moisture content of the uncured resin glue line in order to prevent blistering.

The phenol-resorcinol-aldehyde adhesives have come into prominence since the above work of Nevin and brought with them a new set of problems. Very recently, the discovery has been made of amine-modified condensation resins useful as adhesives that cure within minutes at room temperature. These gel so rapidly after spreading and assembly of the glue joint that there is essentially no opportunity for penetration of the surface cells or even for complete wetting of the surface being bonded.

These problems have been overcome in the present invention by coating the wood surfaces to be bonded with particular resinous primers prior to application of the adhesive. By so doing durable adhesive bonds between wood surfaces can be obtained when using modified aldehyde condensation polymer resins.

SUMMARY OF THE INVENTION

One of the main objects of this invention is in a method of bonding wood to wood or wood to other materials with adhesives that cure at ambient temperature using a resinous primer. The adhesives employed are modified aldehyde condensation polymers further reacted with additional aldehyde donor or an aldehyde-epoxide mixture. The resinous primers useful in conjunction with the preferred adhesives include relatively dilute solutions or dispersions of phenol-resorcinol-formaldehyde resins, and epoxidized phenolic Novolacs.

Materials are bonded together by first coating the surfaces to be bonded with a relatively dilute solution of the resinous primer, allowing the coated surfaces to dry, and coating the primed surfaces with the preferred adhesives.

DETAILED DESCRIPTION OF THE INVENTION

The resin primers described are preferably used in conjunction with phenol-resorcinol-formaldehyde resins or with rapid curing amine-modified aldehyde condensation polymer resins which, because of their fast curing time, do not adequately penetrate the cell walls of the wood being bonded. The resin primer used must (1) be compatible with the adhesive composition, and (2) not completely seal the surfaces of the wood to be bonded. Relatively few resins are capable of meeting these criteria. The resin primers are applied to the surfaces of the material to be bonded as relatively dilute solutions or dispersions. The resin primers which have been found to be useful with the preferred adhesives include phenol-resorcinol-formaldehyde resins and epoxididized phenolic Novolacs.

Typical of the phenol-resorcinol-formaldehyde resins useful in preparing the resin primer are those described in U.S. Pat. No. 3,422,068 which is hereby incorporated by reference. These resins are prepared by condensing 0.55 to 1.2 moles formaldehyde per mole of phenol in the presence of a bivalent metal ion catalyst, such as calcium acetate, to give a predominantly ortho-directed phenolic prepolymer, and reacting from 0.2 to 0.8 mole resorcinol per mole of phenol with the phenolic prepolymer.

The epoxidized Novolacs useful in preparing the primer composition include those having more than one terminal epoxide group per molecule made by the epoxidation of a phenol-formaldehyde Novolac. Preparation of polyepoxides of this type is described in "Handbook of Epoxy Resins" by Lee and Neville, McGraw-Hill Book Company, Inc., 1967.

The primer compositions are prepared by diluting the resin with a carrier vehicle. The phenol-resorcinol-formaldehyde resins are generally dispersed in water or methanol while the epoxidized Novolac is suitably dispersed in an organic solvent such as methylethylketone. The amount of resin present in the carrier vehicle should range from about 0.2 to 2.0 parts by weight resin to 1 part by weight carrier vehicle depending on the particular resin used. The primer is advantageously applied at room temperature to the surfaces to be bonded although higher temperatures are not precluded. At higher temperatures, however, less dilute resins can be used. An amount of primer equivalent to from 1.5 to 25 pounds of resin solids per thousand square feet of wood surface should be applied to each surface of the wood being bonded.

The phenol-resorcinol-formaldehyde resins useful in the practice of the present invention include those mentioned in the aforementioned U.S. Pat. 3,422,068. Other phenol-resorcinol-aldehyde resins readily available commercially are equally suitable, however. These might typically be made according to the disclosures of U.S. Pat. 2,437,710 to Rhodes and 2,489,336 to Spahr et al.

The rapid curing amine-modified aldehyde condensation resins useful with the resin primers of this invention are typically two component materials. The first component is made by reacting a well known aldehyde condensation polymer which includes such resins as the acid or base-catalyzed phenol-aldehyde resins, urea-aldehyde resins, melamine-formaldehyde resins, acetone-formaldehyde resins, etc., with an amine or amines of a particular type. The amount of amine used to react with the aldehyde condensation polymer should range from about 0.05 to 2.0 parts by weight of the amine to each part by weight of the condensation polymer. Preferably 0.1 to 1.0 part by weight of the amine to each part by weight of the condensation polymer is used. More than 2.0 parts by weight of the amine to each part of the aldehyde condensation polymer can be used but there is little advantage in doing so.

The amines useful for modifying the aldehyde condensation polymers include amines of the following types:

(1) primary aromatic means having the formula:

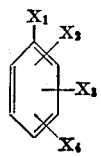

where:

$X_1$ is —NH$_2$, —CH$_2$NH$_2$    $X_2$ is —X$_1$, —OH, —OCH$_3$    $X_3$ is —X$_1$, —COOH, —NO$_2$, —OCH$_3$, —OH, —CH$_3$, —NHCOCH$_3$, —H

—A—⟨⟩

$X_4$ is $C_1$ to $C_4$ alkyl and A is —H

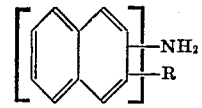

—SO$_2$—
—NH—
—O—
—S—
—C=C—
—S—S— where $Y_1$ and $Y_2$ are hydrogen or alkyl radicals having from 1 to 3 carbon atoms and Z is an integer from 0 to 2.

(2) bis(aminoaryl) compounds having the formula:

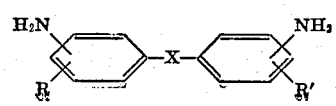

where R and R' are alkoxy, amino, hydrogen, hydroxyl, nitro, carboxyl or $C_1$ to $C_4$ alkyl and X is

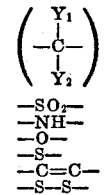

—SO$_2$—
—NH—
—O—
—S—
—C=C—
—S—S— where $Y_1$ and $Y_2$ are hydrogen or alkyl radicals having from 1 to 2 carbon atoms and Z is an integer ranging from 0 to 2.

(3) aminonaphthalenes of the formula:

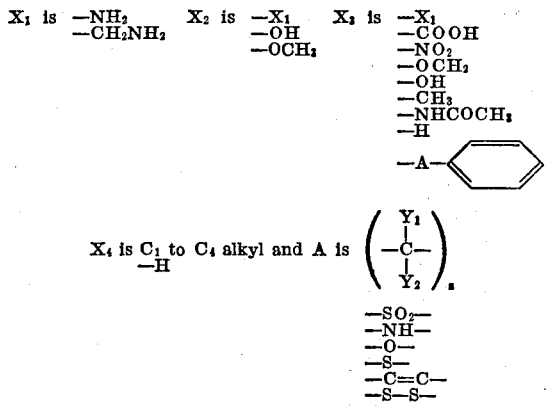

where R may be amino in any open ring position or hydroxyl in the 2, 5 and 8 ring positions when the amino group is in the 1 position; and (4) heterocyclic nitrogen-containing compounds selected from the group consisting of 2,3-, 2,4-, 2,6- or 3,4-diaminopyridine; pyrrole; N-methylpyrrole; 2,4-dimethylpyrrole; or 4,6-diaminopyrimidine.

The preferred amines used in preparation of the foamed adhesives of this invention include m-phenylenediamine, m-hydroxyaniline, 1,5-diaminonaphthalene, 2,6-diaminopyridine and 4,4'-methylenedianiline.

The first resin component or amine-modified adduct is prepared by reacting an amine compound with the aldehyde condensation polymer usually under reflux conditions, in the presence of a small amount of water, methanol, water-methanol mixture, or other suitable carrier. As some of the reactions are exothermic in nature, cooling is often required.

The second component of the resin is either an aldehyde or other methylene group donor or aldehyde-epoxide mixture wherein the epoxide compound used has more than one terminal epoxide group per molecule. When the first and second components are blended together the mixture gels rapidly to an infusible state at ambient temperature.

When aldehyde alone is used it is added to the amine-modified adduct to form an infusible product. The amount of aldehyde hardener is not particularly critical and may range from 0.02 to 1.0 parts by weight aldehyde per part of amine-modified condensation polymer. The preferred aldehyde is formaldehyde as well as the formaldehyde-forming compounds trioxane and paraformaldehyde. Other aldehydes may be used, however, for example, aliphatic or cyclic aldehydes having from 1 to 8 carbon atoms such as glyoxal, acetaldehyde, propionaldehyde, butyraldehyde and furfuraldehyde.

It is advantageous to add epoxide compounds which have more than one epoxide group per molecule along with the aldehyde. The resins modified with an epoxide compound are characterized by greater flexibility and less shrinkage on curing. The epoxide compound can constitute as little as 10 parts by weight or as much as 50 parts by weight to about 90 to 50 parts by weight of the amine-modified polymer.

The amine-modified aldehyde condensation polymer resins may optionally contain a foaming agent to improve gap-filling properties. The foaming agents which may be used to foam the amine-modified resins of this invention include carbon dioxide liberating materials, low boiling aliphatic hydrocarbons, polyhalogenated saturated fluorocarbons and ethers. Exemplary of carbon dioxide liberating compounds are sodium bicarbonate and calcium carbonate which, in the presence of acid, liberate carbon dioxide. Fluorocarbons which may be used include monochlorodifluoromethane, dichlorodifluoromethane, 1,2-dichloro-1,1,2,2-tetrafluoroethane, 1,1,1 - trichloro-2,2,2-trifluoroethane, 1,2-difluoroethane, and trichlorofluoromethane. The compounds should have boiling points ranging from about 0 to 100° C. Among the fluorohalohydrocarbons, trichlorofluoromethane is preferred.

The quantity of foaming agent required to produce a suitable adhesive foam varies with the particular foaming agents used. For most purposes the incorporation of 2 to 50 parts foaming agent per 100 parts per weight of the adhesive composition is preferred.

Preparation of these adhesives is more fully described in copending application Ser. No. 821,567 filed May 5, 1969, now Pat. No. 3,615,975, and entitled "Foamed Resin Adhesives and a Method of Bonding Materials Using the Foamed Resins." This application is hereby incorporated by reference. It should be noted, however, that for the purposes of this invention the resins may or may not be used in the foamed state and may be with or without the epoxy resin. Our preferred adhesive of this type is based on a m-hydroxyaniline modified ortho-directed phenol-formaldehyde novolac.

When bonding wood to wood or to other materials the primer compositions described previously are spread over the surfaces to be bonded and allowed to dry. At that time the preferred adhesives are spread over the primed surfaces and the surfaces to be bonded brought together in intimate contact. Durable adhesive bonds are obtained.

The process of the invention is advantageously used with wood that has been treated with commonly used fire-retardant or preservative salts. These are typically introduced by a vacuum-pressure treatment to give a high concentration of the salt in the surface areas of the product. Such treated wood is notoriously difficult to bond adhesively. The wood must normally be planed to remove a superficial surface deposit of the salt that interferes with bonding. Even when this is done the salt diffused into the cell walls and deposited in the fiber lumens prevents adequate penetration into the wood of conventionally used adhesives. Typical of the salts employed are the ammonium phosphates and sulphate; zinc chloride; borax; boric acid; copper arsenite; sodium arsenate; chromate; and fluoride; pentachlorophenol and many others well known to those skilled in the art. Reference is made to the book "Flameproofing," C. J. West, The Institute of Paper Chemistry-Bibliographic Series, #185 (1959) for other treating materials and methods. Use of the disclosed priming treatment results in significantly improved bond strengths and durability, often on unplaned surfaces as well as planed.

Many adhesives, including those preferred with this invention, will often show good to excellent bond strengths under dry conditions but will fail badly under moist environments or when exposed to weathering. It should be noted that the primers of this invention are used to particular advantage when the glued products are exposed to adverse weathering conditions. One standard industry test for measurement of glue line failure by delamination is AITC 110. The sample specimens are held submerged under water at room temperature and submitted to 20–25 inches of mercury vacuum for 30 minutes and then to 75 p.s.i. pressure for 2 hours. The specimens are then dried approximately 10 hours at 160° F. Delamination on the end grain is estimated by appropriately probing the glue line. Any samples showing less than 5% delamination are considered excellent. It should be emphasized that this is a very severe test and that many adhesive systems will show complete delamination. Thus, for example, a reduction in delamination from 100% to 51% or from 73% to 30% would represent very significant and important improvements in bond quality and durability.

The following examples serve to illustrate the invention:

EXAMPLE 1

A reactor was charged with the following:

45.18 lbs. phenol, 100%
12.26 lbs. flake paraformaldehyde, 91%
4.74 lbs. water
0.5 lb. calcium acetate monohydrate.

Agitation was applied and the mixture heated to reflux (110° C.) in 60 minutes and held under reflux conditions for about 2 hours. The mixture was then slightly cooled and 20.83 lbs. of m-hydroxyaniline added. The mixture was then again heated to reflux (110° C.) and held for 2½ hours and then cooled to about 60° C. Methanol, 16.49 lbs., was then added. The cooling was then continued until room temperature was reached.

A two-component adhesive was prepared with the two components having the following formulation:

| Component | Wt. percent |
|---|---|
| Component A: | |
| Meta-hydroxyaniline resin | 95.04 |
| Concentrated hydrochloric acid | 3.48 |
| Asbestos | 1.48 |
| Component B: | |
| 55% formaldehyde in methanol-water solution | 46.72 |
| Calcium carbonate | 4.68 |
| Silica (Cab-o-sil) | 1.39 |
| Asbestos | 0.49 |
| Epoxide resin (ERL 3794 Union Carbide)—a polyglycidyl ether of phenolformaldehyde Novolac blended with diglycidyl ether of Bisphenol A having an epoxy equivalent wt. viscosity of 7000–19,000 cps. at 25° C. | 46.72 |

Two parts by weight of Component A when mixed with one part by weight of Component B gave a foamed composition, the calcium carbonate reacting with the hydrochloric acid to give off carbon dioxide.

A resin primer composition was formulated by mixing five parts by weight of phenol-resorcinol-formaldehyde polymer prepared as described above in U.S. Pat. No. 3,422,068 with five parts by weight methanol and two parts by weight 55% formaldehyde in methanol-water solution. The primer composition was applied to Douglas-fir wood at a rate of about 20 lbs. per 1000 square feet of each wood surface to be glued. The primer composition contained about 35% of dry resin solids which corresponds to a usage of approximately 7 lbs. per 1000 square feet. It was allowed to dry at room temperature for about 4 hours. Over the primer composition was applied the m-hydroxyaniline-modified aldehyde condensation polymer described above and the surfaces to be bonded brought together in intimate contact and allowed to cure.

The percent delamination of the bonded specimen (based on AITC 110) was zero. A control test made in identical fashion except that the primer was omitted gave 100% delamination on testing.

EXAMPLE 2

A reactor was charged with 444.4 grams m-hydroxyaniline and 222.5 grams methanol and heated to about 75° C. until all of the m-hydroxyaniline had dissolved. The solution was then cooled to 60° C. and 333.1 grams of a urea-formaldehyde concentrate (UF–85, a product of Allied Chemical Co.) added in small increments to control the heat of reaction. During addition of the urea-formaldehyde the temperature was not allowed to rise above about 68° C. After completing the addition of urea-formaldehyde, the resin was allowed to mix an additional 10 minutes at about 69° C. and the resin then cooled to 25° C. The final viscosity of the resin was between "T" and "U" at 25° C. on the Gardner-Holdt viscosity scale. To the urea-formaldehyde resin modified with m-hydroxyaniline, 2 parts by weight, was added 1 part by weight of the epoxide resin-formaldehyde composition described in Example 1.

A primer composition was formulated by mixing together 5.0 parts by weight of a phenol-resorcinol-formaldehyde resin (LT68D, a product of the Borden Chemical Company), 4.5 parts by weight methanol and 2 parts by weight 55% formaldehyde in methanol-water solution. The primer composition was applied to the surfaces of the boards to be glued together at the rate of 20 lbs. per 1000 square feet of surface to be glued and allowed to dry. Over the primed surfaces was spread the fast curing resin described above and the surfaces were brought together and allowed to cure.

The percent delamination (based on AITC 110) was 8.3.

EXAMPLE 3

A rapid curing resin composition was formulated by mixing together the m-hydroxyaniline modified aldehyde condensation polymer of Example 1 (Component A) and an aldehyde-epoxide mixture (Component B) having the following composition:

| | Wt. percent |
|---|---|
| 55% formaldehyde in methanol-water solution | 49.08 |
| Asbestos | 1.84 |
| Epoxy resin made by the epoxidization of: | |
| A phenol-formaldehyde Novolac, the epoxy resin having an average of 2.2 epoxy groups per molecule | 49.08 |

A primer composition was prepared having the following composition:

| | Parts by wt. |
|---|---|
| An epoxidized phenol-formaldehyde Novolac (DEN 438—a product of Dow Chemical Co.) | 100 |
| Triethylenetetramine | 12.7 |
| Methylethylketone | 50 |

The primer composition was spread on the surfaces of the pieces of wood to be bonded together at a spread weight of approximately 20 lbs. per 1000 square feet and the composition allowed to dry. Over the primer composition was spread the fast curing adhesive previously described. The surfaces to be bonded were then brought together and allowed to cure. The percent delamination (based on AITC 110) was zero.

EXAMPLE 4

Douglas fir pieces, ¾" x 5½" x 12", were coated at the rate of 20 lbs./M ft.² of surface with the following primer compositions: (1) the primer composition of Example 1, (2) a primer composition similar to that of Example 1 using 5 parts by weight water as the diluent rather than methanol, and (3) the primer composition of Example 3.

After drying 16 hours at 70° F., the wood pieces were spread with the adhesive composition of Example 1 and pressed 5 minutes at 75 p.s.i. and 75° F. Pressure was then released and the laminates were stored for 12 days at 72° F. Additional laminates were prepared similarly only no primer composition was employed.

The laminates were cut to yield ASTM shear blocks and 5" x 7" specimens for cyclic delamination. The shear blocks were tested according to ASTM procedures recording shear strength and percentage wood failure. The delamination specimens were subjected to one cycle of AITC test #110 and delamination estimated. Results were:

| | 1 | 2 | 3 | No primer |
|---|---|---|---|---|
| Shear strength, p.s.i. | 1,760 | 1,730 | 1,775 | 1,880 |
| Percent wood failure | 85 | 65 | 20 | 10 |
| Percent delamination | 0 | 0 | 51 | 100 |

The increase in wood failure and reduction in delamination of the primed samples represent a very significant improvement in bond quality.

EXAMPLE 5

Douglas fir wood pieces treated with either (1) a water-borne fire-retardant mixture of ammonium sulfate, zinc chloride and boric acid manufactured by J. H. Baxter and Company (Pyresote), or (2) a water-borne ammoniacal copper arsenite preservative (U.S. Pat. No. 2,149,284) (Chemonite), were coated with the primer composition of Example 1 and dried. Half of the test wood pieces were planed before priming while the other half were primed as is.

The wood pieces were double spread with a total of 70 lbs./M ft.² of glue line using a phenol-resorcinol-formaldehyde resin such as described in U.S. 3,422,068. The wood pieces were assembled, held for 15–20 minutes, and pressed at 150 lbs./in.² for 16 hours at 70° F. After release of pressure the laminates were matured for 11 days at 72° F. Specimens for shear and delamination were cut and treated as described in Example 4. Results were:

| | Chemonite | | | | Pyresote | | | |
|---|---|---|---|---|---|---|---|---|
| | Planed | | Unplaned | | Planed | | Unplaned | |
| | Prime | No | Prime | No | Prime | No | Prime | No |
| Shear strength, p.s.i. | 2,710 | 2,740 | 620 | 720 | 1,780 | 1,220 | 1,170 | 780 |
| Percent wood failure | 95 | 80 | 5 | 0 | 75 | 40 | 40 | 5 |
| Percent delamination | 5 | 49 | 100 | 100 | 30 | 73 | 100 | 100 |

These results show the superior wood failure and water resistance of the primed material using hard-to-glue materials.

What is claimed is:

1. A method of bonding wood to wood or other materials comprising:
   coating the surfaces to be bonded with a primer comprising a relatively dilute solution of a resin comprising a phenol-resorcinol-aldehyde polymer,
   allowing the coated surfaces to dry,
   applying over the coated surfaces a rapid, ambient temperature curing resin adhesive comprising an amine-modified aldehyde condensation polymer in admixture with an aldehyde-epoxide resin mixture and a foaming agent, and
   holding the surfaces together until the adhesive cures to form an adhesive bond.

2. The method of claim 1 in which the amine-modified condensation polymer is the reaction product of an aldehyde condensation polymer and an amine selected from the group consisting of
   (a) primary aromatic amines having the formula:

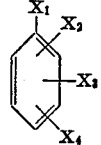

where:

$X_1$ is $-NH_2$, $-CH_2NH_2$    $X_2$ is $-X_1$, $-OH$, $-OCH_3$    $X_3$ is $-X_1$, $-COOH$, $-NO_2$, $-OCH_3$, $-OH$, $-CH_3$, $-NHCOCH_3$, $-H$, $-A-$    $X_4$ is $C_1$ to $C_4$ alky, $-H$ and A is

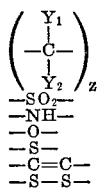

where $Y_1$ and $Y_2$ are hydrogen or alkyl radicals having from 1 to 3 carbon atoms and Z is an integer from 0 to 2.

(b) bis(aminoaryl) compounds having the formula:

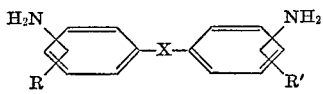

where R and R' are alkoxy, amino, hydrogen, hydroxyl, nitro, carboxyl or $C_1$ to $C_4$ alkyl and X is

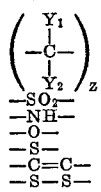

where $Y_1$ and $Y_2$ are hydrogen or alkyl radicals having from 1 to 3 carbon atoms and Z is an integer ranging from 0 to 2;

(c) aminonaphthalenes having the formula:

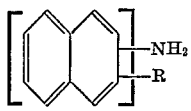

where R may be amino in any open ring position or hydroxyl in the 2, 5 and 8 ring positions when the amino group is in the 1 position; and (d) heterocyclic nitrogen-containing compounds selected from the group consisting of N-methylpyrrole, 2,4-dimethylpyrrole, pyrrole; 2,3-, 2,4- 2,6-, or 3,4-diaminopyridine, and 4,6-diaminopyrimidine.

3. The method of claim 1 in which the primer is applied at a coating weight in the range of 1.5 to 25 pounds of resin solids per thousand square feet of wood surface.

4. The method of claim 1 in which said foaming agent is selected from the group consisting of carbon dioxide liberating materials, low boiling aliphatic hydrocarbons, low boiling ethers, and polyhalogenated saturated fluorocarbons.

5. The method of claim 1 in which said amine-modified condensation polymer comprises a m-hydroxyaniline modified phenolformaldehyde polymer.

6. The method of claim 1 in which said wood is previously treated with a salt to impart fire retardancy or decay resistance.

References Cited

UNITED STATES PATENTS

| | | | |
|---|---|---|---|
| 2,068,759 | 1/1937 | Nevin | 144—309 |
| 2,323,831 | 7/1943 | Menger et al. | 144—309 |
| 2,557,826 | 6/1951 | Keaton et al. | 156—335 X |
| 3,038,826 | 6/1962 | Medl | 156—330 X |
| 3,214,324 | 10/1965 | Peerman | 161—185 |
| 3,224,920 | 12/1965 | Bosworth | 156—315 |
| 3,498,877 | 3/1970 | Christoffersen et al. | 161—209 |
| 3,518,159 | 6/1970 | Freeman et al. | 161—258 |

BENJAMIN R. PADGETT, Primary Examiner

E. A. MILLER, Assistant Examiner

U.S. Cl. X.R.

156—79, 330, 331, 335